(12) United States Patent
Van Den Berg

(10) Patent No.: US 11,199,841 B1
(45) Date of Patent: Dec. 14, 2021

(54) METHODS AND SYSTEMS FOR DETERMINATION OF A ROUTING POLICY FOR AN AUTONOMOUS VEHICLE

(71) Applicant: Nuro, Inc., Mountain View, CA (US)

(72) Inventor: Jur Van Den Berg, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 16/924,061

(22) Filed: Jul. 8, 2020

(51) Int. Cl.
*G05D 1/02* (2020.01)

(52) U.S. Cl.
CPC ... *G05D 1/0212* (2013.01); *G05D 2201/0213* (2013.01)

(58) Field of Classification Search
CPC ........ G05D 1/0212; G05D 2201/0213; B60W 60/00274
See application file for complete search history.

(56) References Cited

U.S. PATENT DOCUMENTS

| | | | |
|---|---|---|---|
| 8,121,749 B1 | 2/2012 | Agrawal et al. | |
| 2015/0345966 A1* | 12/2015 | Meuleau | G01C 21/3453 701/23 |
| 2017/0084178 A1* | 3/2017 | Jain | G08G 1/096827 |
| 2018/0075309 A1* | 3/2018 | Sathyanarayana | G05D 1/0055 |
| 2018/0261093 A1* | 9/2018 | Xu | G08G 1/096775 |
| 2019/0049970 A1* | 2/2019 | Djuric | G06N 20/00 |
| 2019/0250000 A1 | 8/2019 | Zhang et al. | |
| 2020/0159213 A1* | 5/2020 | Svegliato | B60W 60/00 |
| 2020/0207353 A1* | 7/2020 | Chen | B60W 30/18163 |
| 2020/0307589 A1* | 10/2020 | Li | B60W 30/16 |

OTHER PUBLICATIONS

AltexSoft Inc, "How to Solve Vehicle Routing Problems: Route Optimization Software and Their APIs", Medium, retrieved from the Internet: https://medium.com/@AltexSoft/how-to-solve-vehicle-routing-problems-route-optimization-software-and-their-apis-ede6fe8fa86b, Oct. 31, 2019, 14 pages.

Atagoziyev et al., "Lane Change Scheduling for Autonomous Vehicles", IFAC-PapersOnLine, vol. 49, Issue 3, 2016, pp. 61-66.

Chen, Bill, "Autonomous Vehicle Routing at rideOS", Medium, rideOS Engineering, retrieved from the Internet: https://medium.com/rideos/autonomous-vehicle-routing-at-rideos-a0f7306b283e, Oct. 3, 2018, 6 pages.

(Continued)

*Primary Examiner* — Hunter B Lonsberry
*Assistant Examiner* — Matthew J. Reda

(57) ABSTRACT

Methods and systems for determining an optimal routing policy for an autonomous vehicle are described. A set of states that represent portions of lanes are determined. A set of costs for a set of actions is associated with each state. The set of actions includes a stay in lane action, a lane change action, and a forced lane change action. A lane change action has a non-deterministic outcome with a probability based on the length of the state. A cost for a stay in lane action is greater or equal than a length of the state and a cost of a forced lane change action is the reciprocal of a success rate of lane changes. An optimal routing policy is determined for the autonomous vehicle according to a shortest path first (SPF) algorithm run on the set of states based on the set of costs and the set of actions.

20 Claims, 7 Drawing Sheets

(56) References Cited

OTHER PUBLICATIONS

Paden et al., "A Survey of Motion Planning and Control Techniques for Self-driving Urban Vehicles", IEEE Transactions on Intelligent Vehicles, vol. 1, No. 1, 2016, 27 pages.

Wei et al., "A Prediction- and Cost Function-Based Algorithm for Robust Autonomous Freeway Driving", IEEE Intelligent Vehicles Symposium, Jun. 21-24, 2010, pp. 512-517.

Yang et al., "Development of realistic shortest path algorithm considering lane changes", Journal of Advanced Transportation, vol. 50, 2016, pp. 541-551.

Zhang, Mengzhe, "Path planning for autonomous vehicles", Iowa State University, Graduate Theses and Dissertations, 2014, 80 pages.

Zhou et al., "Local Path Planning of Driverless Car Navigation Based on Jump Point Search Method Under Urban Environment", Future Internet, vol. 9, No. 3, 2017, pp. 1-13.

* cited by examiner

DETERMINE A SET OF STATES, WHERE EACH STATE OF THE SET OF STATES REPRESENTS A PORTION OF A LANE OF A ROAD AND THE STATE HAS A LENGTH
102

> WHERE THE LENGTH OF A STATE IS A DISTANCE 103A

> WHERE THE LENGTH OF A STATE IS AN INTERVAL OF TIME 103B

DETERMINE FOR EACH FIRST STATE OF THE SET OF THE STATES AN ASSOCIATED SET OF COSTS FOR A SET OF ACTIONS, WHERE THE SET OF ACTIONS INCLUDES A STAY IN LANE ACTION, A LANE CHANGE ACTION, AND A FORCED LANE CHANGE ACTION
104

DETERMINE AN OPTIMAL ROUTING POLICY FOR THE AUTONOMOUS VEHICLE TO A DESTINATION LOCATION ACCORDING TO A SHORTEST PATH FIRST (SPF) ALGORITHM RUN ON THE SET OF STATES BASED ON THE SET OF COSTS AND THE SET OF ACTIONS ASSOCIATED WITH EACH ONE OF THE SET OF STATES
106

Figure 1A

METHODS AND SYSTEMS FOR DETERMINATION OF A ROUTING POLICY FOR AN AUTONOMOUS VEHICLE

TECHNICAL FIELD

Embodiments of the invention relate to the field of autonomous vehicles; and more specifically, to the determination of an optimal routing policy for an autonomous vehicle.

BACKGROUND ART

The field of autonomous vehicles (AVs) is a maturing technology with the potential to reshape mobility by enhancing the safety, efficiency, and accessibility of automotive transportation. Multiple critical tasks need to be executed by an autonomous vehicle to ensure a safe motion of the vehicle in its environment. These critical tasks include route planning for the vehicle.

Route planning considers road network data, the destination of the autonomous vehicle and outputs one or more sequences of positions through the road network that the vehicle can move to reach the destination. Route planning in autonomous driving includes the selection of a route through the road network from the current position of the AV to the destination of the AV. Several mechanisms exist for selecting a route for the AV. Some existing route planning mechanisms represent the road network as a directed graph with edge weights corresponding to the cost of traversing a road segment, such a route can be formulated as the problem of finding a minimum-cost path on a road network graph. However, these route planning mechanisms generate graphs that contain millions of edges making classical shortest path algorithms such as Dijkstra impractical.

BRIEF DESCRIPTION OF THE DRAWINGS

The invention may best be understood by referring to the following description and accompanying drawings that are used to illustrate embodiments of the invention. In the drawings:

FIG. 1A illustrates a flow diagram of exemplary operations that can be performed for determining a routing policy for an autonomous vehicle, in accordance with some embodiments.

DETAILED DESCRIPTION

Figure 1B:
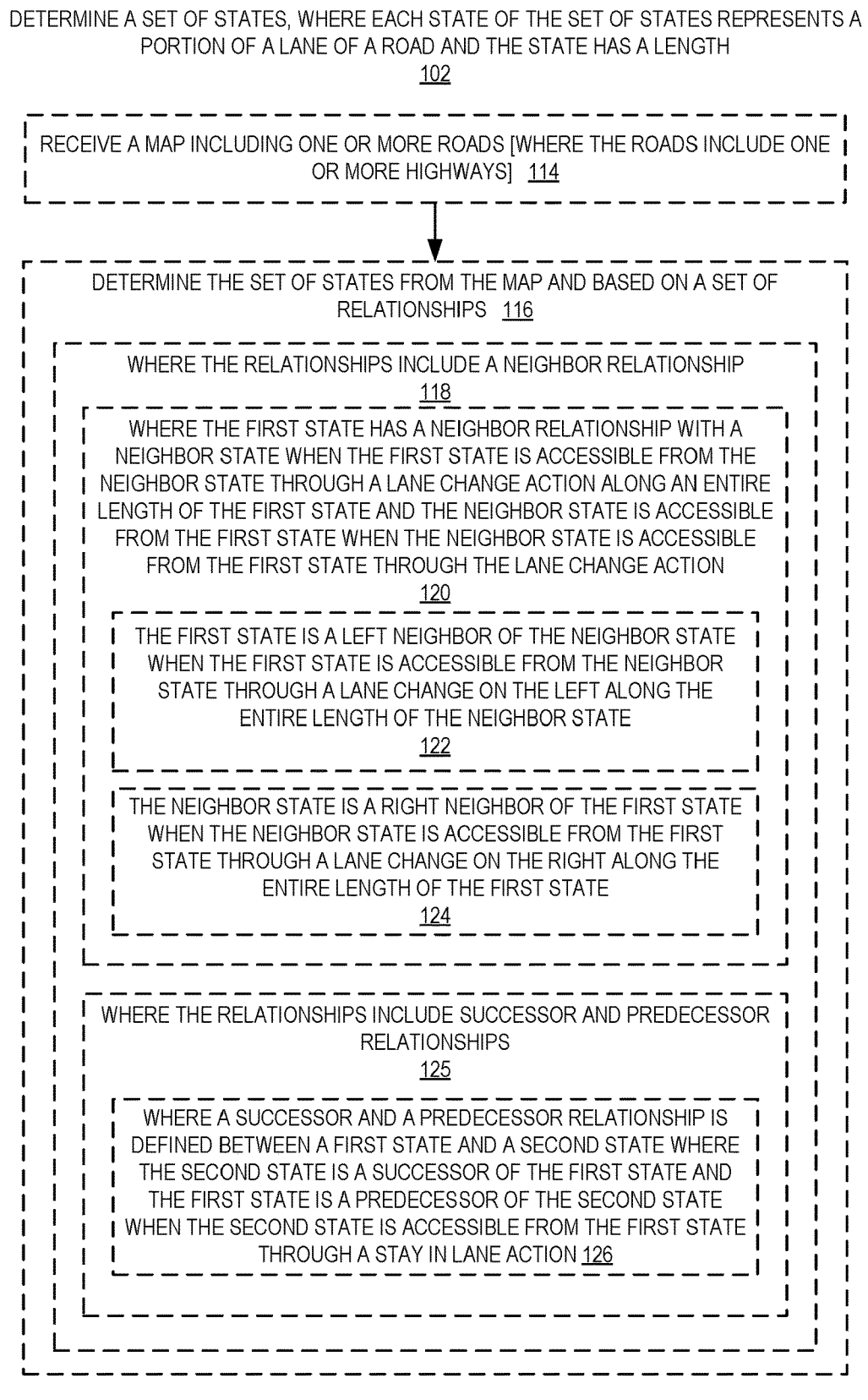
FIG. 1B illustrates a flow diagram of exemplary operations that can be performed for determining the set of states, according to some embodiments.

The following description describes methods and apparatus for determining an optimal routing policy for an autonomous vehicle. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate-level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

Methods and systems for determination of a routing policy for an autonomous vehicle are described. The embodiments described herein enable the generation of a lane graph on which an efficient shortest path algorithm can be run based on costs associated with the vertices of the lane graph to determine an optimal routing policy for the autonomous vehicle. To determine the lane graph, a set of states are determined, where each state of the set of states represents a portion of a lane of a road and the state is associated with a length; and for each state of the set of the states an associated set of costs is determined for a respective set of actions. The set of actions includes a stay in lane action that defines a first movement of the autonomous vehicle from the first state to a second state that succeeds the state in the same lane. The set of actions further includes a lane change action that defines a second movement of the autonomous vehicle from the first state to a third state when the third state succeeds a neighbor of the state and the lane change action is associated with a probability of failure of the lane change action between the first state and the third state that is non-null. In other words, a lane change action has a non-deterministic outcome, a first outcome where the vehicle stays in its current lane and a second outcome where the vehicle moves to a neighboring lane. The probability of each outcome is determined based on the length of the state. The set of actions further includes a forced lane change action that defines a third movement of the autonomous vehicle from the first state to the third state and the forced lane change action is guaranteed to succeed from the first state to the third state with a probability of failure of lane being null. Each cost of the set of costs for each state of the states for a stay in lane action is greater or equal than the length of the state and the cost of a lane change action is determined based on a probability that a lane change succeeds between a pair of the states of unit length. An optimal routing policy is determined for the autonomous vehicle to a destination location according to a shortest path first (SPF) algorithm run on the set of states based on the set of costs and the set of actions associated with each one of the set of states.

The operations in the flow diagrams will be described with reference to the exemplary embodiments of the other figures, e.g., FIGS. 2A-B and FIGS. 3-5. However, it should be understood that the operations of the flow diagrams can be performed by embodiments of the invention other than those discussed with reference to the other figures, and the embodiments of the invention discussed with reference to these other figures can perform operations different from those discussed with reference to the flow diagrams.

The operations described herein can be part of a flow of operations performed by a system for enabling an autonomous vehicle to move from a current position towards a destination. For example, the operations can be performed for the vehicle 402. The vehicle 402 is an autonomous vehicle (AV), which is also known as a self-driving vehicle, a connected and autonomous vehicle (CAV), a driverless car/truck, a robo-car/truck, or a robotic vehicle. In some embodiments, the vehicle 402 is a fully automated vehicle, where the vehicle is operative to move without any assistance or intervention of a driver. Alternatively, the vehicle 402 can be a semi-autonomous vehicle, which can also be referred to as assisted-driving vehicle, where the operation of the vehicle relies on some degree of automation, while still having a driver in charge of the vehicle. The vehicle 402 includes an autonomous driving system (ADS) 400 that is operative to perform autonomous driving tasks for the vehicle. In some embodiments, the ADS 400 of the vehicle 402 is operative to manage interactions of the vehicle 402 with one or more objects and determine a trajectory for the vehicle resulting in actuator commands that cause the vehicle to move towards a destination. The ADS 400 is typically located on the vehicle 402. For example, the ADS 400 can be located in the cabin (or cab) of the vehicle when the vehicle is a tractor or a truck. In some embodiments, the tasks may include determining an optimal route or an optimal routing policy for the vehicle. The optimal route or the optimal routing policy can be used in the determination of the trajectory for the vehicle for a predetermined interval of time. In some embodiments, the operations described herein can be performed as part of a motion planning for the vehicle 402 when the vehicle is moving on highways.

FIG. 1A illustrates a flow diagram of exemplary operations that can be performed for determining a routing policy for an autonomous vehicle, in accordance with some embodiments. In some embodiments, all or a subset of the operations of FIG. 1A can be performed by the routing unit 456. The routing unit 456 is part of the ADS 400 that is located on an autonomous vehicle. In other embodiments, all or a subset of the operations of FIG. 1A can be performed on a computing system, e.g., 403 that is remote from the vehicle 402. For example, a subset of the operations of FIG. 1A can be performed by the lane graph determiner 494. The lane graph determiner 494 can be included as part of the routing unit 456 or alternatively as part of the computing system 403. In these embodiments, the computing system 403 can be coupled with the ADS 400 through a wide area network (wireless and wired communication networks).

Determining the States of the Lane Graph

At operation 102, the lane graph determiner 494 determines a set of states. Each state of the set of states represents a portion of a lane of a road and the state is associated with a length. FIGS. 2A-2B illustrates exemplary portions of two distinct roads for which respective sets of states have been defined. FIG. 2A is a portion of a side of a highway 202A that includes an exit. The portion of the highway can be part of a network of roads that are considered when determining the routing policy for the vehicle 402. While only this portion is illustrated one of ordinary skill in the art would understand that the determination of the states is performed for all roads that are part of the network roads. For example, the set of states is determined for all roads that may be taken by the vehicle to reach one or more destinations. When the vehicle is part of a fleet of vehicles (e.g., a truck that transports goods within a state or across a given geographical region), the vehicle may have one or more possible destinations and the network of roads encompasses all or a subset of all roads within the geographical region that can be used by the vehicle to reach these destinations. The portion of the road 202A includes the set of states S1, S2, . . . , S18. Each one of these states is associated with a respective length. The portion of the road 202B includes the set of states S'1, S2, . . . , S'14. In some embodiments, the length of the state is a distance between two positions on the road. For example, the length for the state S1 expresses the distance between the first end and the second end of this portion of the lane as illustrated in FIG. 2A. Alternatively, the length of the state can be an interval of time. For example, the length can be expressed in seconds. In some embodiments, the determination of the set of states is performed as described with reference to FIG. 1B.

Figure 2B:
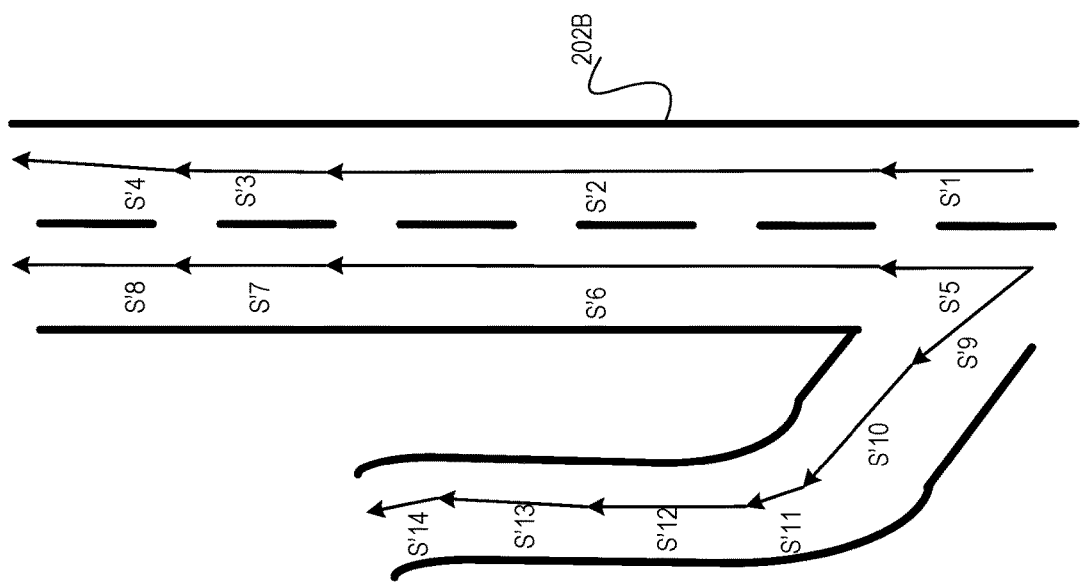
FIG. 2B illustrates a block diagram of a second exemplary portion of a road that can be taken by an autonomous vehicle towards a destination, according to some embodiments.
Figure 2A:
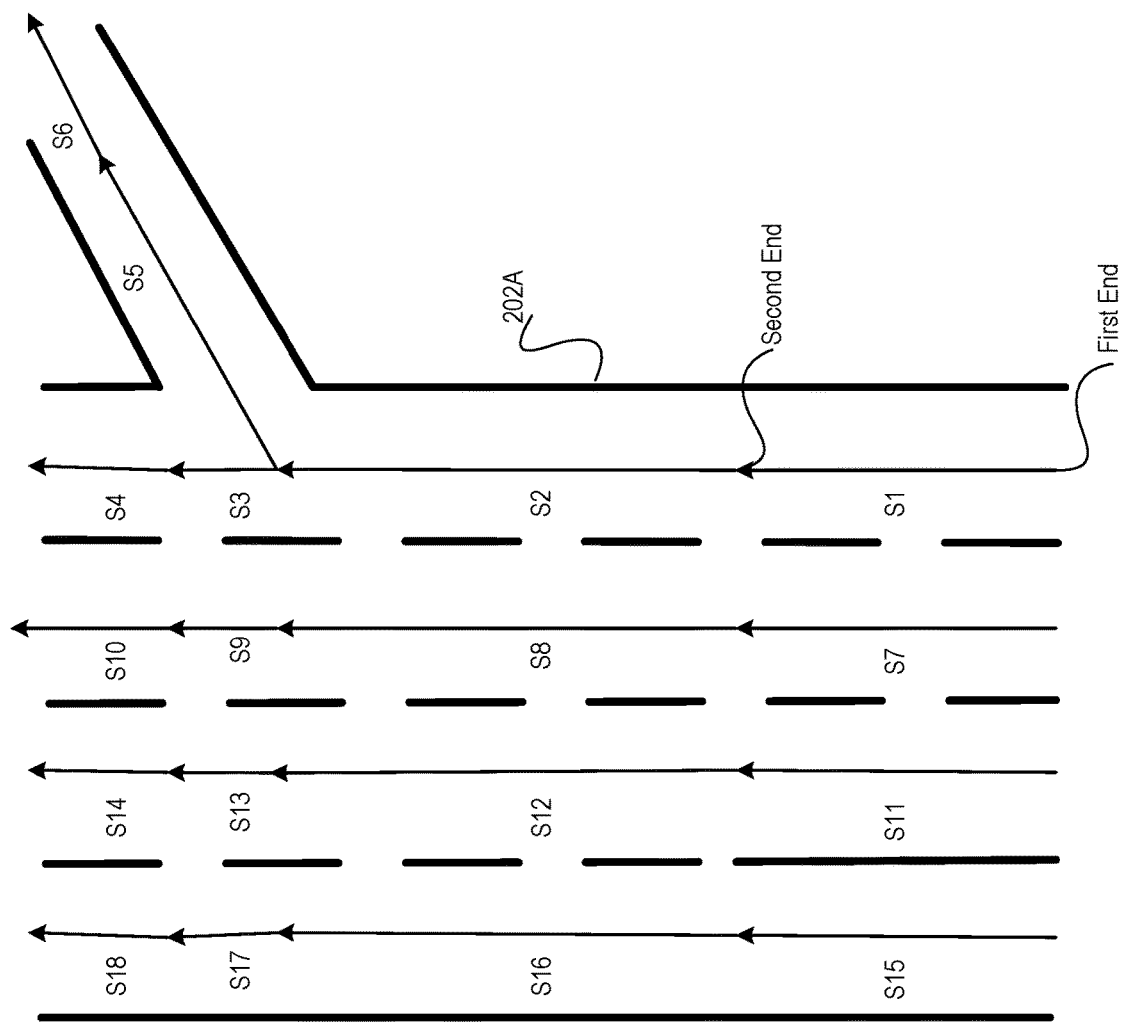
FIG. 2A illustrates a block diagram of a first exemplary portion of a road that can be taken by an autonomous vehicle towards a destination, according to some embodiments of the invention.

FIG. 1B illustrates a flow diagram of exemplary operations that can be performed for determining the set of states, according to some embodiments. At operation 114, the lane graph determiner 494 receives a map including one or more roads. The roads include one or more highways. The roads are the multiple options that the vehicle may take when moving towards a given destination.

The flow moves to operation 116, at which the lane graph determiner 494 determines the set of states from the map and based on a set of predefined relationships. Each relationship from the set of relationships between the states includes one of a neighbor relationship (operation 118), a successor relationship, or a predecessor relationship (operation 125).

The neighbor relationship is defined between a first state of the set of states and a neighbor state of the set of states when the first state is accessible from the neighbor state through a lane change along the entire length of the first state and the neighbor state is accessible from the first state through a lane change along the entire length of the second state (operation 120). Further, each state has at most a single left neighbor and at most a single right neighbor. The neighbor relationship can be a left neighbor relationship or a right neighbor relationship. A first state, e.g., state S7, is a left neighbor (operation 122) of a neighbor state, e.g., state S1, when the first state S7 is accessible from the neighbor state S1 through a lane change on the left along the entire length of the neighbor state. The neighbor state S1 is a right neighbor (operation 124) of the first state S7 when the neighbor state S7 is accessible from the first state S1 through a lane change on the right along the entire length of the first state S7. Successor and predecessor relationships are defined (operation 126) between a state, e.g., S8, of the set of states and a second state of the set of states, e.g., S9, where the second state S9 is a successor of the first state S8 and the first state S8 is a predecessor of the second state S9 when the second state S9 is accessible from the first state S8 when a vehicle continues driving in the same lane (without changing lanes). In other words, the second state is accessible from the first state through a stay in lane action. In some embodiments, a state may have more than one successor states, e.g., state S2 has two successors S3 and S5. Further, in some embodiments, a state may have more than one predecessor. The successor and predecessor relationships are symmetric, i.e., when a state is the successor of another state, the other state is a predecessor to the state.

Each one of the set of states (S1-S18 or S'1-S'14) is determined such that it satisfies the following properties: 1) Each state from the set of states has at most one left neighbor, (when S is a state, S_ln is a neighbor of S on the left) and at most one right neighbor (when S is the state, S_rl is the neighbor on the right); 2) Each state has a set of successors and a set of predecessors and if a state is a successor of another state, then this other state is accessible from the state by continuing driving in the same lane; 3) each state has an associated length. The condition that the neighbor relationship is one-to-one (each state has at most one left neighbor and at most one right neighbor) results in a lane graph as illustrated in FIG. 2A or FIG. 2B. For example, the breaking up of the lanes into separate states in the left lanes cascade to the right lanes and vice versa. In FIGS. 2A-B, the centerlines that separate lanes on the road are shown in thicker lines. In FIG. 2A, the states S2, S8, S12, and S16 are separate from S1, S7, S11, and S15 because the neighbor relationship among the two left lanes changes. In fact, S15 and S11 are not considered neighbors as they are separated with a solid centerline, which renders the lane change between S15 and S11 illegal. In contrast S16 and S12 are considered neighbors as the centerline is a dashed line indicating that a change of lane is possible between S16 and S12. Similarly, a change of lane is possible between S11 and S7, S7 and S1. The separation between state S15 and S16, and between S11 and S12 in the left two lanes cascades to the right lanes to maintain the one-to-one neighbor relationship. The states S3, S9, S13, and S17 are separate from the states S2, S8, S12, and S16, because the right lane splits into two (S2 is split into S3 and S5). The states S4, S10, S14, and S18 are separate from S3, S9, S13, and S17 because the right lane is no longer a neighbor of the exiting lane. Several mechanisms can be used for defining the set of states that satisfies the relationship described herein. In one such mechanism, an initial set of states can be input (e.g., the initial set of states can be defined by a user where a state defined a lane in a road network), one or more set of states of the initial set of states are automatically divided into multiple states to obtain a new set of states that satisfies the following characteristics: 1) Each state from the set of states has at most one left neighbor, (when S is a state, S_ln is a neighbor of S on the left) and at most one right neighbor (when S is the state, S_rl is the neighbor on the right); 2) Each state has a set of successors and a set of predecessors and if a state is a successor of another state, then this other state is accessible from the state by continuing driving in the same lane; 3) each state has an associated length.

Determining the Costs for States and Actions of the Lane Graph

Referring back to FIG. 1A, the flow of operations moves to operation 104, at which the lane graph determiner 494 determines for each state of the set of the states an associated set of costs for a set of actions. The set of actions are actions that a vehicle can take from a state to another state. The set of actions includes a stay in lane action, a lane change action, and a forced lane change action.

Figure 3:
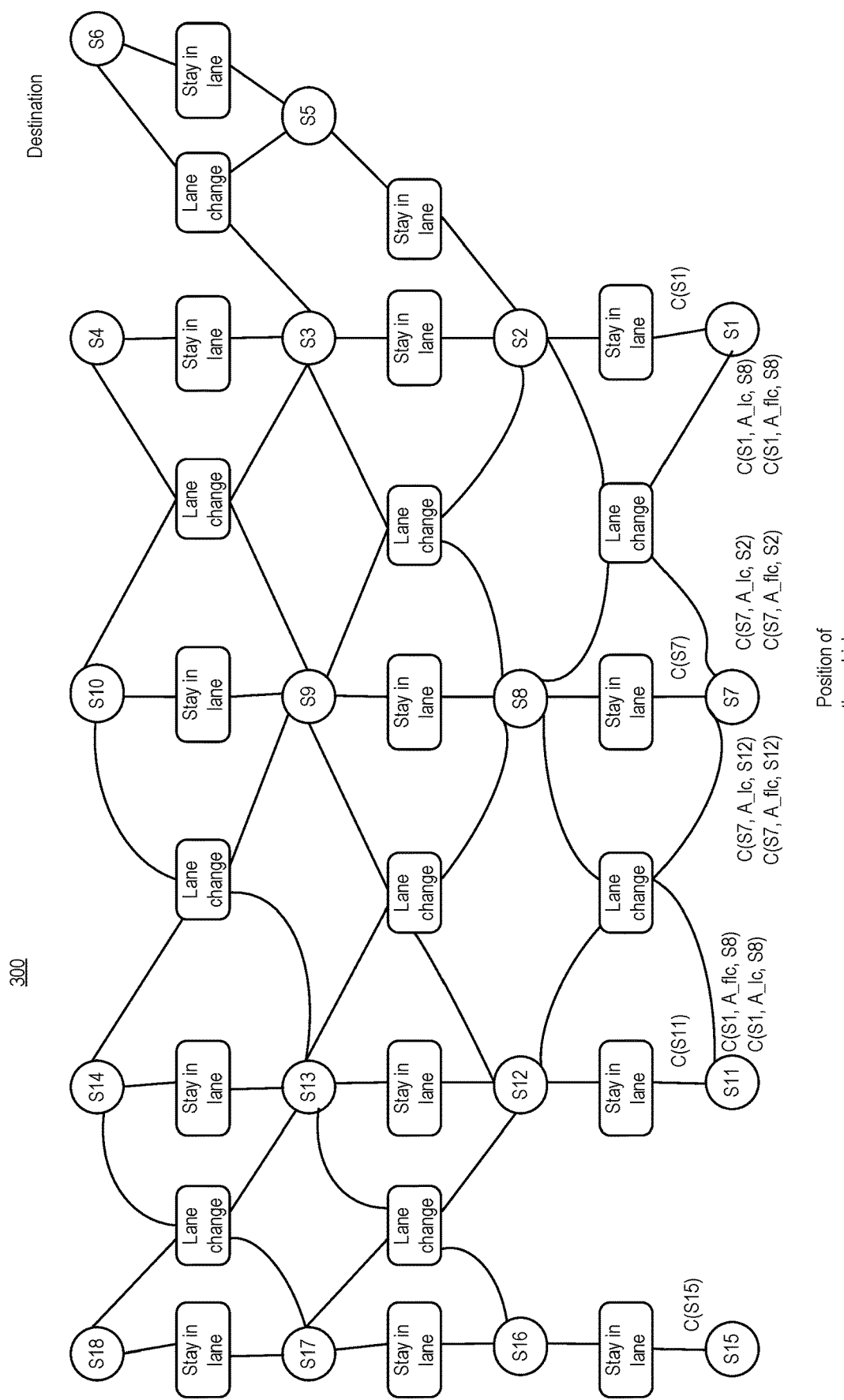
FIG. 3 illustrates a block diagram of an exemplary lane graph that can be generated for the autonomous vehicle, according to some embodiments.

Each action is associated with a cost of the vehicle taking that action. The costs associated with a state will be described with reference to state S7 in FIG. 3. FIG. 3 illustrates an exemplary lane graph including states S1-S18, a set of actions (stay in lane, lane change, forced lane change) and some exemplary costs associated with the states and actions, in accordance with some embodiments. The lane graph represents the states S1-S18 described with reference to FIG. 2A. While some embodiments herein will be described with respect to a subset of the states, e.g., state S7, of lane graph 300, one of ordinary skill in the art would understand that this is intended to be exemplary only and that each state in the lane graph 300 is associated with one or more costs, where each cost correspond to the cost of the vehicle taking a respective action from that state to transition to another one of the states. While the actions for state S7 includes a stay in lane action from state S7 to state S8, a lane change action from state S7 to state S2, a forced lane change action from state S7 to state S2, a lane change action from state S7 to state S12, and a forced lane change action from state S7 to S12, some states may only have a subset of these actions defined. For example, a state such as S15 may only have a stay in lane action defined as the lane change action from S15 to S12 is not allowed (due to the line between the lanes). Similarly, state S16 does not have a lane change action defined for changing lanes to the left as the portion of the lane that defines S16 does not have a neighboring lane on the left, therefore the lane change action and forced lane change action are defined only for the neighboring right lane (towards state S13).

The stay in lane action defines a first movement of the autonomous vehicle from a first state to a second state that succeeds the state in the same lane. The second state is a successor to the first state as defined by the successor relationship. The first state is a predecessor of the second state as defined by the predecessor relationship. The stay in lane action causes the vehicle to move from a start position of the portion of the lane represented by the state S7 to the start position of the lane represented by the state S8, which coincides with the end of the portion of the lane represented by the state S7. The stay in lane action is expressed as A_sl. For a state S, A_sl is associated with a respective cost C(A_sl, S), which represents the cost of the stay in lane action when the initial state is S (i.e., when the vehicle is located in the portion of the lane that is represented by the state S). The cost and probability of a stay in lane action for a state S, a stay in lane action A_sl, and a successor state S_s can be expressed with the following expression:

$$C(S, A\_sl, S\_s) = C(S) \text{ with } p(S\_s | S, A\_lc) = 1. \quad (1)$$

Where C(s, A_sl, S_s) is the cost of performing action A_sl for the vehicle to move from state S to state S_s, where S_s is the successor state to state S. The cost of the stay in lane action is greater or equal to the length of the state S. In some embodiments, the cost of the stay in lane action is determined by a user that is configuring the system for the autonomous vehicle. For example, the cost can be set to be equal to the length of the state S. In other embodiments, the cost can be set to be equal to a sum of the length of the state S and a penalty associated with a behavior that is to be discouraged for the vehicle. For example, if the portion of the lane represented by the state for which the cost is to be determined is a leftmost lane, e.g., state S16, the cost of the stay in lane action for this state can be equal to a sum of the length and a positive non-null value, which represents a penalty of being on the leftmost lane. Thus, a user may select to increase the cost of a stay in lane action based on the position of the lane and a behavior of the vehicle that is to be discouraged. While the example herein describes a scenario where the behavior to be discouraged is to be in a leftmost lane, in other examples, other types of behaviors can be discouraged (e.g., being in the middle lane, being in the rightmost lane, etc.). The probability of success of a stay in lane action for the state is 1 such that a vehicle that is located in a state that has a successor state is always able to move to the successor state through this action.

The lane change action defines a second movement of the autonomous vehicle from the first state to a third state when the third state succeeds a neighbor of the first state and the lane change action is associated with a probability of failure of the lane change action between the first state and the third state that is non-null. The lane change action is possible for some of the states and depends on whether or not a state has neighbors. When the lane change action is possible from a state to a neighbor state, e.g., from state S7 to right neighbor state S2 or from state S7 to left neighbor state S12, the lane change action may not always succeed. For example, traffic and/or objects located in a neighbor state may make a lane change impossible. A lane change action is associated with a probability of success of the lane change, i.e., a probability of the vehicle moving from state S7 to state S2 by executing a lane change action that is non-null. In general, the probability of success of the lane change action is defined such that there is a higher probability of success of the lane change when the length of the state is greater. For example, when the length is a distance, the longer the distance is, the higher chance the vehicle has of succeeding in executing the lane change action. Similarly, when the length is an interval of time, the longer the interval of time is, the more likely the vehicle is to succeed in executing the lane change action. Alternatively, when the length is smaller (in time or distance), the less likely the vehicle is to succeed in executing the lane change and reaching the state S2. Thus, it is assumed that the lane change action can succeed or fail. For example, for the state S7, a left lane change action is defined that causes the autonomous vehicle to move from the state S7 to the state S12, and a right left lane change action is defined that causes the autonomous vehicle to move from the state S7 to the state S2. The lane change action causes the vehicle to move from the initial end of the portion of the lane represented by the state S7 to the initial end of the portion of the lane represented by a successor of the neighbor state of S7 when the lane change action is successful (state S2 is a successor of state S1 that is a neighbor to state S7 and state S12 is a successor of state S1/ that is a neighbor to state S7). Alternatively, the lane change action causes the vehicle to move from the initial end of the portion of the lane represented by the state S7 to the initial end of the portion of the lane represented by the successor of state S7, here state S8, when the lane change action is not successful. Thus, a cost and a probability are defined for a lane change action A_lc for a state S, S_s a successor of the state S, S_n a neighbor of a state S, and S_ns, a successor of the neighbor of state S, according to the following equations:

$$C(S,A\_lc,S\_ns)=c\_lc+C(S\_n) \text{ with } p(S\_ns|S,A\_lc)=p(l) \qquad (2)$$

$$C(S,A\_lc,S\_s)=C(S) \text{ with } p(S\_s|S,A\_lc)=1-p(l) \qquad (3)$$

Where l=min(length(S),length(S_n)), i.e., l is a minimum length between the length of the state S and the S_n, the neighbor of state S, p(l) the probability that the lane change succeeds over the length l, and c_lc is the cost for making the lane change. This cost is applied in order to discourage the autonomous vehicle from changing lanes unless necessary. Thus, adding the cost c_lc is performed to discourage the selection of undesired behavior such as a lane change and encourages the selection of stay in lane actions for the vehicle.

In the model defined herein, some states of the lane graph will have a cost for reaching the destination that is equal to infinity (i.e., the goal cannot be reached from these states). For example, if the destination of the vehicle is to take the exit that includes states S5 and S6 in FIG. 2A, the cost associated with state S18 is infinity since if the vehicle reaches the state S18 it cannot take the exit at S5. Therefore, the state is assigned an infinite cost that discourages the selection of this state as part of a viable routing policy for the autonomous vehicle. However, since the lane graph is a stochastic model, some parts of the lane graph will have a non-zero probability of reaching one of those states, and would therefore have an expected cost-to-go of infinity as well. To avoid such a scenario, a forced lane change action is defined. The forced lane change action defines a third movement of the autonomous vehicle from the first state to the third state that is a neighbor of the first state and the force lane change action is guaranteed to succeed from the first state to the third state with a probability of failure of lane being null. When selected this action causes the vehicle to move from an initial end of a state to an initial end of a state that is a successor of the neighbor state. For example, the forced lane change action for state S7 is defined to cause the vehicle to move from state S7 to state S2 or alternatively from state S7 to state S12. The following costs and transition probabilities are defined for a state S, a neighbor state S_n, a successor of a neighbor state S_ns, a forced lane change action A_flc:

$$C(S, A\_flc, S\_ns) = c\_lc + p(l)C(S\_n) + (1 - p(l))(C(S) + c\_flc) \qquad (4)$$

with $p(S\_ns | S, A\_flc) = 1$.

Where l=min(length(S),length(S_n)), i.e., l is the minimum length between the length of the state S and the S_n, the neighbor of state S, p(l) the probability that the lane change succeed over the length l, and c_flc is the cost for making the forced lane change, where c_flc is greater or equal to 0. In the embodiments described herein the cost of a forced lane change is set to be equal to the reciprocal of the success rate of lane changes per unit of length. Whether a lane change succeeds is modeled as a memory-less exponential probability distribution with success rate alpha (α). That means that if the autonomous vehicle were to continually attempts to change lanes then a number of lane changes equal to (alpha×length) are expected to succeed after driving a distance of length, which is expressed as the following equation (5):

$$p(l) = 1 - \exp(-\alpha l) \qquad (5)$$

Alpha ($\alpha$), which represents the success rate of lane changes per unit of length is expressed as follows:

$$\alpha = -\log(1 - p_{unit}) \qquad (6)$$

Where $p_{unit}$ is the probability that a lane change action succeeds between a pair of lanes of unit length.

Determining the Optimal Routing Policy Based on the Lane Graph

Upon determination of the states and the costs associated with one or more actions for each one of the states, the flow of operations moves to operation 106. When the cost of forced lane change is set to be equal to the reciprocal of the success rate of lane changes as per equation (5) and the cost of a stay in lane for a state C(S) is greater or equal to the length of the state S for each one of the states, the determination of an optimal policy for the autonomous vehicle to a destination location can be performed with the SPF algorithm that is run on the lane graph 300 defined based on the set of states, the set of associated costs, and the associated probabilities, where the states, the costs and the probabilities are defined as described with reference to the operations 102 and 104.

In other words, when the conditions described above are satisfied (where the cost of a stay in lane action for each one of the states of the set of states is greater or equal than the length of the state and the cost of forced lane change is set to be equal to the reciprocal of the success rate of lane changes) the determination of the optimal policy at operation 106 is performed by considering the lane graph 300 as a Markov Decision Process (MDP), where the states of the MDP are the portions of lanes; the actions of the MDP are the actions that a vehicle can take from a given state to another state including the stay in lane action, the forced lane change action, and the lane change action; and the reward function of the MDP for transitioning from a state to another state with a respective one of the actions is the cost of moving from the lane portion to another lane portion by the vehicle taking one of the lane change action, the stay in lane action, or the forced lane change action; and the probability associated with each action is defined as described above.

Formulating the routing task as an MDP by defining the lane graph 300 allows the ADS 400 to determine the optimal policy for reaching a destination of the AV by calculating an expected cost function for reaching the destination with an efficient SPF algorithm (such as Dijkstra algorithm). The calculation of the expected cost function is based on the multiple costs associated with the actions of the states between the destination and a position of the vehicle. The position of the vehicle can be a current position of the vehicle when the vehicle is already in motion, or alternatively, the position of the vehicle can be a start position of the vehicle from which the vehicle is expected to start its route. The cost function can be defined with multiple inputs. In particular, the cost function takes as inputs the costs associated with the actions defined herein that a vehicle may take for transitioning from one state to another state of the lane graph. As described above the costs can be defined to encourage and/or discourage certain behavior(s) and/or action(s) for the vehicle. For example, a user may want to discourage both lane changes and driving on the leftmost lanes of highways. In this scenario, higher costs are assigned to actions that would favor that undesired behavior. In one example, costs for performing a stay in lane action in the leftmost states (e.g., S15, S16, S17, and S18) will be higher than costs associated with stay in lane actions for the right lane states, such as S7-S10 or S1-S4. In contrast, costs for lane changes from the leftmost states towards the right states will be lower than the costs for lane changes from the rightmost states towards the left states. Setting proper costs that correspond to the desired behavior of the vehicle results in a determination of an optimal policy (an optimal set of states and actions) for the vehicle that discourages the AV from changing lanes and encourages the vehicle to stay in lane on the right side of the road as much as possible consequently resulting in a safe driving behavior for the AV.

The cost function may further have other inputs than the costs associated with the actions of the vehicle. For example, the inputs of the cost function may further include costs associated with objects detected in the environment of the vehicle. The determination of the optimal policy includes the calculation of an expected cost function starting from the destination of the vehicle to a position of the vehicle and optimizing the expected cost function. For example, optimization of the cost function may include finding the subset of actions that minimize the cost function from the destination to the position of the vehicle. Thus, the optimal routing policy determined for the AV specifies the set of actions and states that the autonomous vehicle should take from the position of the vehicle to the desired destination. The SPF can be run at multiple levels of the lane graph 300 such that an optimal policy can be determined for the AV for a final destination, and/or one or more intermediary destinations for the vehicle. For example, the SPF can be run to determine an optimal routing policy for the vehicle from the state S7 to the exit S5. Alternatively, the SPF can be run on a larger section of the road network considering multiple roads and lanes of these roads to determine an optimal routing policy for the AV from an origin position (from the which the vehicle is to start moving, e.g., a warehouse from which goods are picked up) to a final destination (e.g., another warehouse to which the goods are delivered).

The embodiments described herein enable the definition of a routing problem for an autonomous vehicle as an MDP that can be efficiently computed using a SPF (such as Dijkstra's algorithm). In some embodiments, the SPF starts from the destination of the vehicle and propagates through the lane graph that includes states representing portions of lanes and associated actions and costs to compute an expected cost function to the destination and determines an optimal action from each state towards another state based on the expected cost function. The embodiments described herein allow to optimally trade-off a selection of the best possible lane to drive in for the autonomous vehicle given the possibility that lane changes do not always succeed at any given moment. The embodiments herein enable a motion planning process to select a trajectory for the vehicle 102 that causes the autonomous vehicle to start lane changing earlier as to be reasonably confident that the lane change succeeds at some point in order to ensure that the vehicle is moving towards the destination.

In some embodiments, the operations described with reference to FIGS. 1A-B can be performed to determine a routing policy that is used as part of a motion planning process, e.g., performed by the motion planner 450, for determining a trajectory of the autonomous vehicle for a period of time. For example, the lane graph determiner 494 may generate a lane graph as described herein, which can be used at least in part by the trajectory generator 454 to determine the trajectory. The trajectory can be determined at least in part by running the SPF on the lane graph. In some embodiments, the trajectory can be determined by considering other elements of the environment of the vehicle such as objects detected by the perception unit 430 that are included in the surroundings of the vehicle.

Architecture

Figure 4:
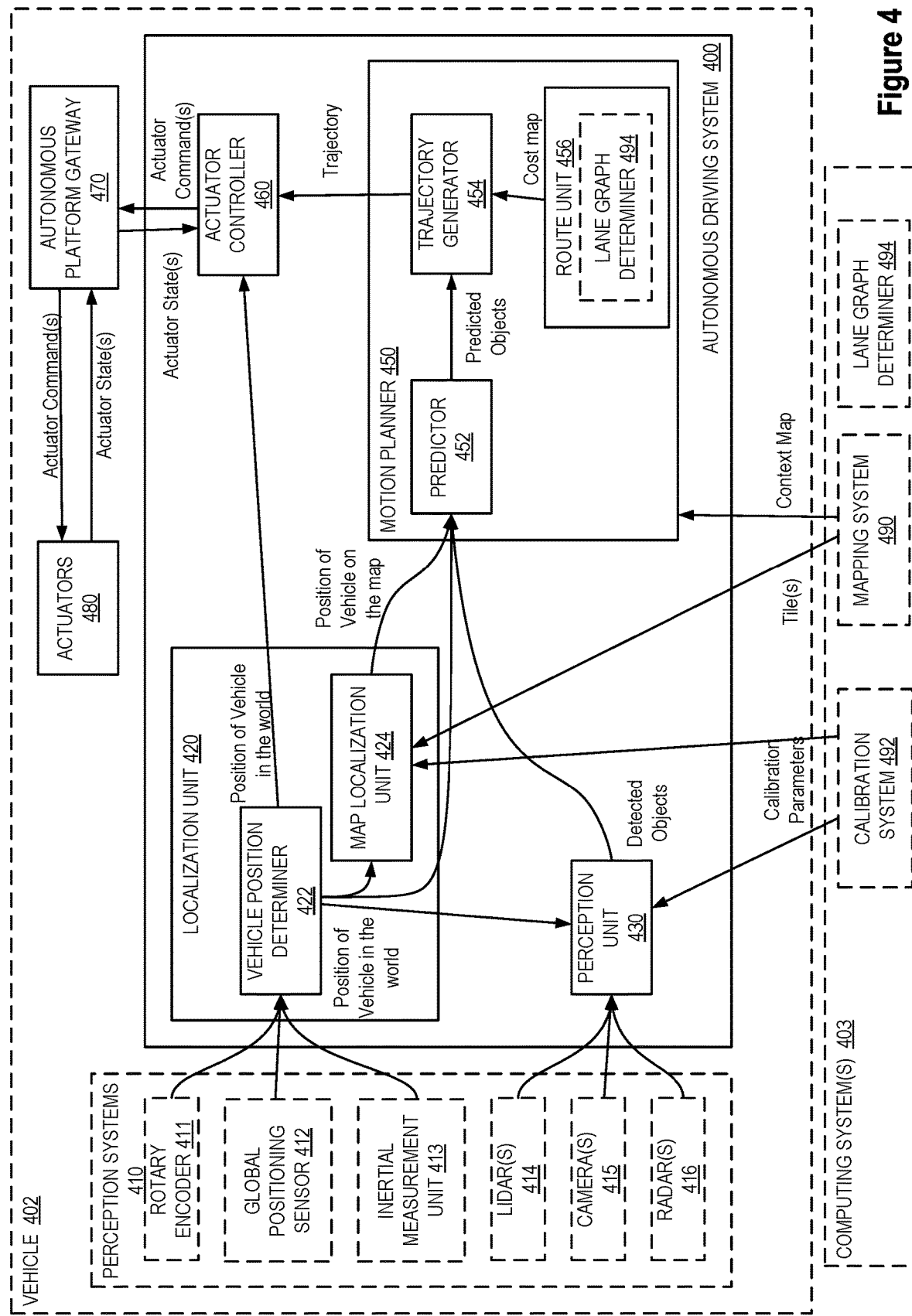
FIG. 4 illustrates a block diagram of an exemplary autonomous driving system that can be used in some embodiments.

FIG. 4 illustrates a block diagram of an exemplary autonomous driving system (ADS) 400 that can be used for determining motion of an autonomous vehicle, in some embodiments. While in some embodiments, the ADS 400 is implemented as described with reference to FIG. 4, in other embodiments, different implementations can be considered without departing from the scope of the embodiments described herein.

The ADS 400 is operative to perform autonomous driving tasks for the vehicle. In some embodiments, the ADS 400 of the vehicle 402 is operative to manage interactions of the vehicle 402 with one or more objects. The ADS 400 is coupled with perception systems 410, a calibration system 495, a mapping system 490, and a lane graph determiner 494. In some embodiments, one or more of the mapping system 490, the lane graph determiner 494, and the calibration system 495 can be implemented in a same electronic device as the ADS 400. In other embodiments, one or more the mapping system 490, the lane graph determiner 494, and the calibration system 495 can be implemented on a different electronic device that is located remotely from the electronic device on which the ADS 400 is implemented. In some embodiments, the calibration system 495 and the mapping system 490 can be optional.

The perception systems 410 include one or more sensors that can be used to record sensor measurements. The perception systems 410 may include a rotary encoder 411, a global positioning sensor 412, an inertial measurement unit 413, one or more lidars 414, one or more cameras 415, and one or more radars 416. In some embodiments, fewer or more sensors can be included as part of the perception systems 410. For example, the perception systems 410 may include only cameras 415 without including radars 416 and/or lidars 414. In another example, the perception systems 410 includes a combination of cameras and lidars, a combination of cameras and radars, or a combination of lidars and radars. Other combinations can be considered.

The ADS 400 includes a localization unit 420 that is coupled with the rotary encoder 411, the GPS sensor 412, and the IMU 413. These sensors transmit inputs to the localization unit 420, which are used to determine the position of the vehicle in the world (through the vehicle position determiner 422) and/or on a map (the map localization unit 424). The ADS 400 further includes a perception unit 430. The perception unit 430 is operative to receive sensor data from the cameras, lidars, radars and/or other sensors, the position of the vehicle in the world and on the map and detect objects that are located in the vicinity of the vehicle 402. The ADS 400 includes a motion planner 450 that is operative to determine a trajectory for the vehicle during an interval of time. The motion planner includes a predictor 452, a trajectory generator 454, and a routing unit 456. The routing unit 456 is operative to determine one or more routes through the road network to the destination of the AV. In some embodiments, the routing unit 456 is operative to output a routing policy that identifies a one or more sequences of optimal actions and associated positions that the AV can take to reach the destination. In some embodiments, the routing unit 456 is operative to perform the operations described herein with respect to FIGS. 1A-3. The motion planner 450 determines a trajectory that is fed to the actuator controller 460. The motion planner 450 is operative to receive inputs related to the position and the destination of the vehicle and the position and motion of a set of one or more objects. The objects are detected based on sensor measurements of perception systems coupled with the ADS 400. The sensor measurements are analyzed to identify the objects that are located in the vicinity of the vehicle 402. The motion planner 450 is further operative to determine and output a trajectory that the vehicle 402 is to follow during an interval of time. In some embodiments, the inputs related to the position and the destination of the vehicle include the position of the vehicle 402 in the world, the position of the vehicle on a map, a road topology, and a route for the vehicle 402. The route for the vehicle 402 may include a start position and a destination position. In some embodiments, the route input is an optimal route determined according to the embodiments described herein in further detail. In some embodiments, the motion planner 450 may take into consideration other inputs different from a single optimal route. For example, multiple routes can be considered. In another example, a routing policy can be considered. The routing policy can be considered in terms of a succession of states and associated costs that minimize a global cost function in a road system for the vehicle to reach the destination. The road topology includes a topology of several roads that can lead from the start position to the destination. The trajectory defines the movement of the vehicle in the interval of time and is to be translated into control commands that can be executed by different actuators of the vehicle 402. The actuator controller 460 transmits control commands and receives actuator states from an autonomous platform gateway 470. The control commands are used to adjust the steering, gas, and brakes of the vehicle 402. The autonomous platform gateway 470 acts as an interface between the actuators of the vehicle 402 and the ADS 400.

The motion planner 450 determines the trajectory of the vehicle 402 for a predetermined interval of time. The interval of time is the length of the period during which the future movement of the vehicle is defined by the trajectory. In other words, the trajectory defines the multiple positions that the vehicle is to take in the next interval of time. In some embodiments, the interval of time for which the trajectory is generated can vary from few milliseconds to few seconds. In one non-limiting example, the trajectory is generated for an interval of time of 12 seconds (e.g., the next 12 sec that follows the current time at which the trajectory is determined). In other examples, the trajectory can be generated for other lengths of the interval of time (e.g., 5 seconds, 10 seconds, 15 seconds, 30 seconds, 1 minutes, etc.) or a range of interval of times between 5 ms to 30 ms, without departing from the scope of the present embodiments such that at different iteration of the trajectory determination a different interval of time is considered. In some embodiments, the determination of the trajectory is repeatedly performed by the trajectory generator 454 at a given frequency. Typically, the frequency of trajectory determination is different from the length of the interval of time for which the trajectory is determined. For example, the time between two trajectory determination occurrences is typically less than the interval of time. In a non-limiting example, the frequency of trajectory determination can be in the milliseconds (e.g., every 100 ms, every 50 ms, every 200 ms, etc.) while the interval of time for the trajectory is in the seconds (e.g., 5 seconds, 10 seconds, 12 seconds, 15 seconds, 30 seconds, 1 minutes, etc.).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices, allowing them to communicate via wire through plugging in a cable to a physical port connected to a NIC. One or more parts of an embodiment of the invention may be implemented using different combinations of software, firmware, and/or hardware.

Figure 5A:
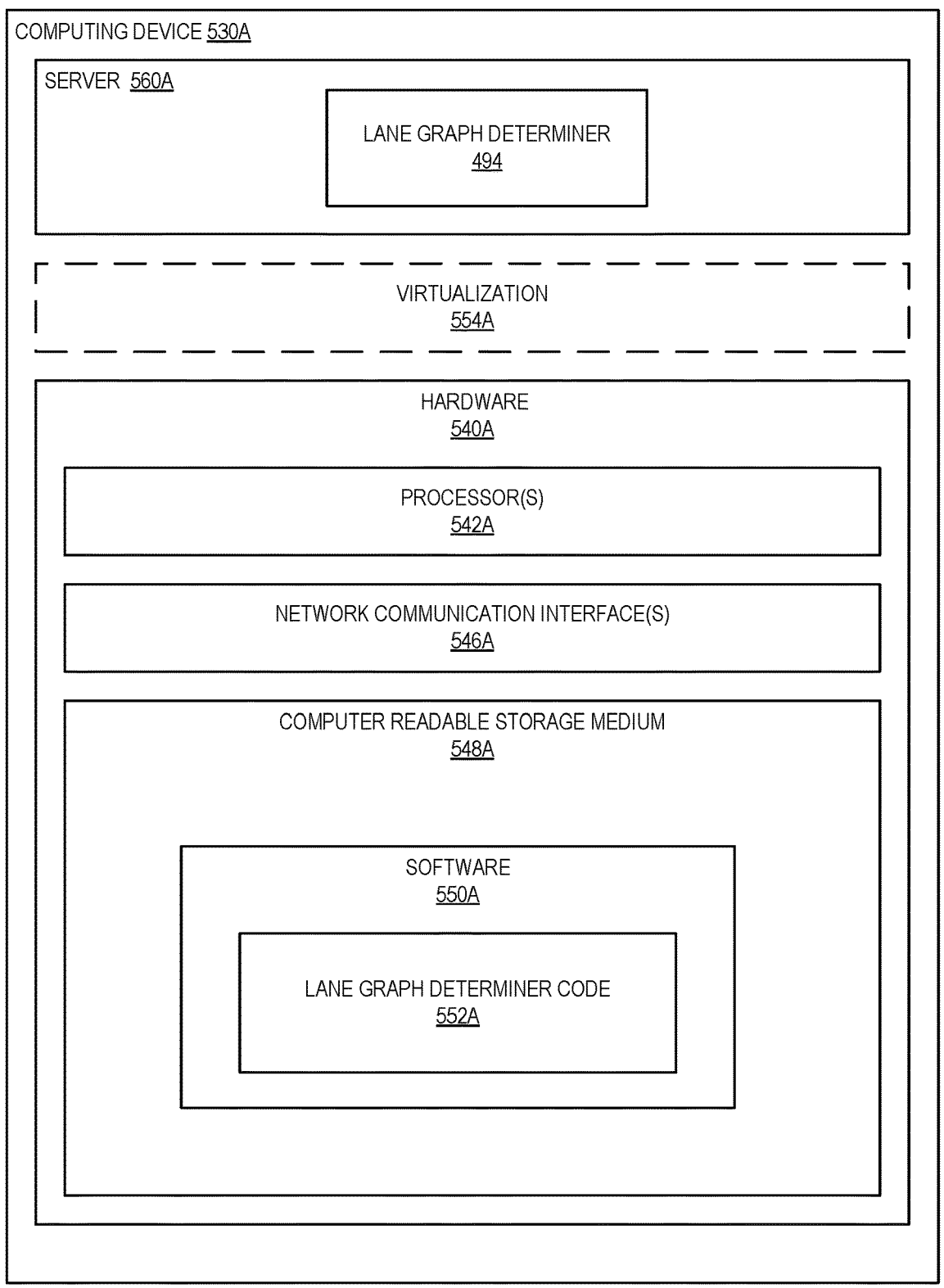
FIG. 5A illustrates a block diagram of an exemplary computing device that can be used for determining an optimal routing policy for an autonomous vehicle, according to some embodiments.

FIG. 5A illustrates a block diagram of an exemplary computing device that can be used for determining a lane graph that can be used for the determination of an optimal routing policy for the AV, according to some embodiments.

The computing device 530A includes hardware 540A comprising a set of one or more processor(s) 542A (which are often COTS processors) and physical network communications interfaces (NIs) 546A, as well as non-transitory machine-readable storage media 548A having stored therein software 550A. During operation, the processor(s) 542A execute the software 550A to instantiate one or more sets of one or more applications. While one embodiment does not implement virtualization, alternative embodiments may use different forms of virtualization. For example, in one such alternative embodiment the virtualization layer 554A represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554A represents a hypervisor (sometimes referred to as a virtual machine monitor (VMM)) or a hypervisor executing on top of a host operating system, and each of the sets of applications is run on top of a guest operating system within an instance called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540A, directly on a hypervisor (in which case the unikernel is sometimes described as running within a LibOS virtual machine), or in a software container, embodiments can be implemented fully with unikernels running directly on a hypervisor represented by virtualization layer 554A, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization, if implemented, are collectively referred to as software instance(s). Each set of applications, corresponding virtualization construct if implemented, and that part of the hardware 540A that executes them (be it hardware dedicated to that execution and/or time slices of hardware temporally shared), forms a separate computing element(s) that is operative to perform the operations described with reference to FIGS. 1A-3.

It will be appreciated that additional components, not shown, may also be part of the computing devices 530A, and, in certain embodiments, fewer components than that shown in FIG. 5A may also be used in a computing device 530A.

Figure 5B:
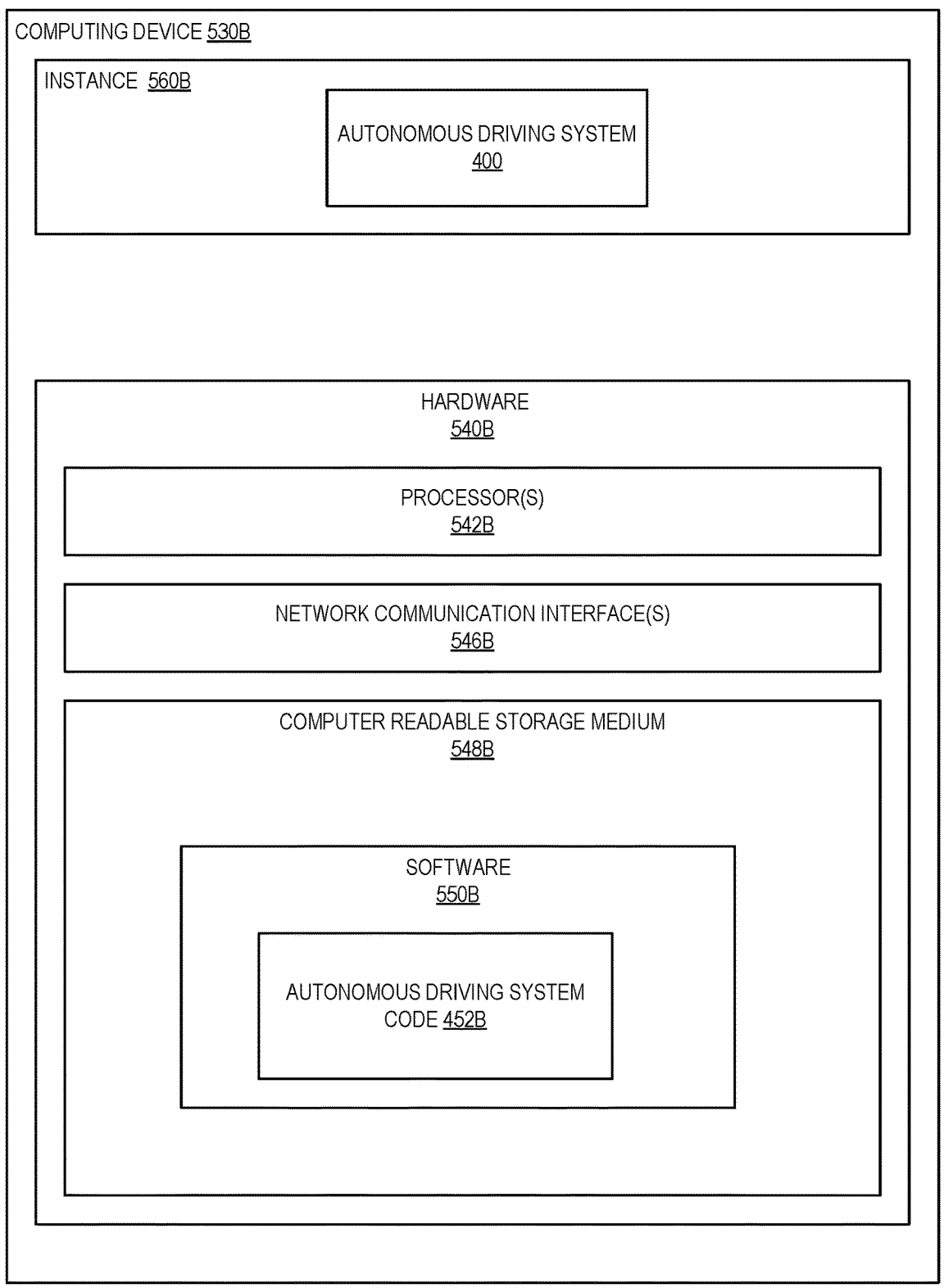
FIG. 5B illustrates a block diagram of an exemplary computing device that can be used for implementing an autonomous driving system, according to some embodiments.

FIG. 5B illustrates a block diagram of an exemplary computing device that can be used for implementing an autonomous driving system, according to some embodiments.

The computing device 530B includes hardware 540B comprising a set of one or more processor(s) 542B (which are often COTS processors) and physical network communications interfaces (NIs) 546B, as well as non-transitory machine-readable storage media 548B having stored therein software 550B. During operation, the processor(s) 542B execute the software 550B to instantiate one or more sets of one or more applications.

The instantiation of the one or more sets of one or more applications are collectively referred to as software instance (s). Each set of applications and that part of the hardware 540B that executes them (be it hardware dedicated to that execution and/or time slices of hardware temporally shared), forms a separate computing element(s) that is operative to perform the operations described with reference to the ADS 400 of FIGS. 1A-3.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the FIGS. 1A-B show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

What is claimed is:

1. A method of determining a routing policy for an autonomous vehicle to a destination location, comprising:
   determining a set of states comprising a plurality of states, each of the plurality of states representing a portion of a lane of a road and having an associated length;
   determining, for each particular state of the set of states, a set of one or more costs, each cost of the one or more costs corresponding to the autonomous vehicle taking a respective action of a set of associated actions, each of the set of associated actions comprising one of a plurality of actions, each of the plurality of actions corresponding to a transition from the particular state to another state of the set of states and associated with a predetermined probability of failure of the transition from the particular state to the other state, the plurality of actions comprising:
      a stay in lane action that defines a first movement of the autonomous vehicle from the particular state to a second state that succeeds the particular state in a same lane as the particular state and is associated with a first cost,
      a lane change action that defines a second movement of the autonomous vehicle from the particular state to a third state that succeeds a neighbor of the particular state, in a same lane as the neighbor of the particular state, wherein the lane change action associated with the predetermined probability of failure of the second movement that is non-null and a second cost that is set to discourage undesired behavior of the lane change action when the stay in lane action is available, and
      a forced lane change action that defines a third movement of the autonomous vehicle from the particular state to the third state to ensure that a forced lane change succeeds with the predetermined probability of failure of the forced lane change being null,
   wherein determining the set of one or more costs comprises:
      determining the first cost for the stay in lane action for a respective state of the set of states that is at least the length of the respective state,
      determining the second cost for the lane change action for the respective state of the set of states, and
      determining a third cost for the forced lane change action for the respective state of the set of states that is derived from a reciprocal of a success rate of lane changes per unit of length; and
   determining the routing policy for the autonomous vehicle to the destination location according to a shortest path first (SPF) algorithm run on a Markov decision process (MDP) based on at least the set of states, the set of one or more costs, the set of associated actions, and the predetermined probability for each action in the set of associated actions, wherein a reward function of the MDP is derived based on the set of one or more costs, wherein the third cost is calculated with an equation of:

$$C(S, A_{flc}, S_{ns}) = c_{lc} + p(l)C(S_n) + (1-p(l))(C(S) + c_{flc}),$$

where $C_{lC}$ is the second cost, S is the respective state, l is a minimum length between a first length of the respective state S and a neighboring state S_n, p(l) is a probability that the lane change succeeds over the length l, c_flc is a cost assigned for making the forced lane change action and is greater than or equal to 0, and $S_{ns}$ is a successor of the neighbor state S_n.

2. The method of claim 1, wherein the determining the set of states is performed based on a neighbor relationship, wherein a first state of the set of states has a neighbor relationship with a neighbor state of the set of states when the first state is accessible from the neighbor state through the lane change action along an entire length of the first state and the neighbor state is accessible from the first state when the neighbor state is accessible from the first state through the lane change action.

3. The method of claim 1, wherein the determining the set of states is performed based on successor and predecessor relationships, wherein the successor and predecessor relationships are defined between a first state of the set of states and a successor state of the set of states when the successor state is accessible from the first state with the stay in lane action.

4. The method of claim 1, wherein the length of a state is a distance between a start of the portion of the lane and an end of the portion of the lane.

5. The method of claim 1, wherein the length of a state is an interval of time.

6. The method of claim 1, further comprising deriving the success rate of lane changes by modeling lane change success as an exponential probability distribution.

7. The method of claim 1, wherein determining the routing policy for the autonomous vehicle to the destination location includes:
   executing the SPF algorithm at multiple levels of a lane graph such that the routing policy is determined for the destination location and one or more intermediary destinations of the autonomous vehicle.

8. The method of claim 1, wherein determining the routing policy for the autonomous vehicle to the destination location includes:
   determining a subset of actions for a subset of states from the destination location to a current position of the autonomous vehicle that minimize cost to reach the destination location based on the first cost, the second cost, and the third cost.

9. The method of claim 1, wherein determining the routing policy includes selecting an action to transition from the respective state to a next state according to the SPF algorithm run on the MDP based on the first cost, the second cost, and the third cost.

10. A non-transitory computer-readable storage medium that provides instructions, which when executed by a processor cause said processor to perform operations for determining a route for an autonomous vehicle from a start location to a destination location, the operations comprising:
   determining a set of states comprising a plurality of states, each of the plurality of states representing a portion of a lane of a road and having an associated length;
   determining, for each particular state of the set of states, a set of one or more costs, each cost of the one or more costs corresponding to the autonomous vehicle taking a respective action of a set of associated actions, each of the set of associated actions comprising one of a plurality of actions, each of the plurality of actions corresponding to a transition from the particular state to another state of the set of states and associated with a predetermined probability of failure of the transition from the particular state to the other state, the plurality of actions comprising:
      a stay in lane action that defines a first movement of the autonomous vehicle from the particular state to a second state that succeeds the particular state in a same lane as the particular state and is associated with a first cost,
      a lane change action that defines a second movement of the autonomous vehicle from the particular state to a third state that succeeds a neighbor of the particular state, in a same lane as the neighbor of the particular state, wherein the lane change action associated with the predetermined probability of failure of the second movement that is non-null and a second cost that is set to discourage undesired behavior of the lane change action when the stay in lane action is available, and
      a forced lane change action that defines a third movement of the autonomous vehicle from the particular state to the third state to ensure that a forced lane change succeeds, with the predetermined probability of failure of the forced lane change being null,
   wherein determining the set of one or more costs comprises:
      determining the first cost for the stay in lane action for a respective state of the set of states that is at least the length of the respective state,
      determining the second cost for the lane change action for the respective state of the set of states, and
      determining a third cost for the forced lane change action for the respective state of the set of states that is derived from a reciprocal of a success rate of lane changes per unit of length; and
   determining a routing policy for the autonomous vehicle to the destination location according to a shortest path first (SPF) algorithm run on a Markov decision process (MDP) that includes the set of states, the set of one or more costs, the set of associated actions, and the predetermined probability for each action in the set of associated actions, wherein a reward function of the MDP is derived based on the set of one or more costs, wherein the third cost is calculated with an equation of:

$$C(S, A_{flc}, S_{ns}) = c_{lc} + p(l)C(S_n) + (1-p(l))(C(S) + c_{flc}),$$

where $C_{lC}$ is the second cost, S is the respective state, l is a minimum length between a first length of the respective state S and a neighboring state S_n, p(l) is a probability that the lane change succeeds over the length l, c_flc is a cost assigned for making the forced lane change action and is greater than or equal to 0, and $S_{ns}$ is a successor of the neighbor state S_n.

11. The non-transitory computer-readable storage medium of claim 10, wherein the determining the set of states is performed based on a neighbor relationship, wherein a first state of the set of states has a neighbor relationship with a neighbor state of the set of states when the first state is accessible from the neighbor state through the lane change action along an entire length of the first state and the neighbor state is accessible from the first state when the neighbor state is accessible from the first state through the lane change action.

12. The non-transitory computer-readable storage medium of claim 10, wherein the determining the set of states is performed based on successor and predecessor relationships, wherein the successor and predecessor relationships are defined between a first state of the set of states and a successor state of the set of states when the successor state is accessible from the first state with the stay in lane action.

13. The non-transitory computer-readable storage medium of claim 10, wherein the length of a state is a distance between a start of the portion of the lane and an end of the portion of the lane.

14. The non-transitory computer-readable storage medium of claim 10, wherein the length of a state is an interval of time.

15. The non-transitory computer-readable storage medium of claim 10, wherein the instructions are further configured to cause the processor to derive the success rate of lane changes by modeling lane change success as an exponential probability distribution.

16. A computing device for determining a routing policy for an autonomous vehicle to a destination location, the computing device comprising:
a non-transitory computer-readable storage medium configured to store instructions; and
a processor coupled with the non-transitory computer-readable storage medium and configured to process the stored instructions to perform the following operations of:
determining a set of states comprising a plurality of states, each of the plurality of states representing a portion of a lane of a road and having an associated length;
determining, for each particular state of the set of states, a set of one or more costs, each cost of the one or more costs corresponding to the autonomous vehicle taking a respective action of a set of associated actions, each of the set of associated actions comprising one of a plurality of actions, each of the plurality of actions corresponding to a transition from the particular state to another state of the set of states and associated with a predetermined probability of failure of the transition from the particular state to the other state, the plurality of actions comprising:
a stay in lane action that defines a first movement of the autonomous vehicle from the particular state to a second state that succeeds the particular state in a same lane as the particular state and is associated with a first cost,
a lane change action that defines a second movement of the autonomous vehicle from the particular state to a third state that succeeds a neighbor of the particular state, in a same lane as the neighbor of the particular state, wherein the lane change action associated with the predetermined probability of failure of the second movement that is non-null and a second cost that is set to discourage undesired behavior of the lane change action when the stay in lane action is available, and
a forced lane change action that defines a third movement of the autonomous vehicle from the particular state to the third state to ensure that a forced lane change succeeds with the predetermined probability of failure of the forced lane change being null,
wherein determining the set of one or more costs comprises:
determining the first cost for the stay in lane action for a respective state of the set of states that is at least the length of the respective state,
determining the second cost for the lane change action for the respective state of the set of states, and
determining a third cost for the forced lane change action for the respective state of the set of states that is derived from a reciprocal of a success rate of lane changes; and
determining the routing policy for the autonomous vehicle to destination location according to a shortest path first (SPF) algorithm run on a Markov decision process (MDP) that includes the set of states, the set of one or more costs, the set of associated actions, and the predetermined probability for each action in the set of associated actions, wherein a reward function of the MDP is derived based on the set of one or more costs,
wherein the third cost is calculated with an equation of:

$$C(S, A_{flc}, S_{ns}) = c_{lc} + p(l)C(S_n) + (1-p(l))(C(S) + c_{flc}),$$

where $C_{lC}$ is the second cost, S is the respective state, l is a minimum length between a first length of the respective state S and a neighboring state S_n, p(l) is a probability that the lane change succeeds over the length l, c_flc is a cost assigned for making the forced lane change action and is greater than or equal to 0, and $S_{ns}$ is a successor of the neighbor state S_n.

17. The computing device of claim 16, wherein the determining the set of states is performed based on a neighbor relationship, wherein a first state of the set of states has a neighbor relationship with a neighbor state of the set of states when the first state is accessible from the neighbor state through the lane change action along an entire length of the first state and the neighbor state is accessible from the first state when the neighbor state is accessible from the first state through the lane change action.

18. The computing device of claim 16, wherein the determining the set of states is performed based on successor and predecessor relationships, wherein the successor and predecessor relationships are defined between a first state of the set of states and a successor state of the set of states when the successor state is accessible from the first state with the stay in lane action.

19. The computing device of claim 16, wherein the length of a state is a distance between a start of the portion of the lane and an end of the portion of the lane.

20. The computing device of claim 16, wherein the length of a state is an interval of time.

* * * * *